Figure 3:
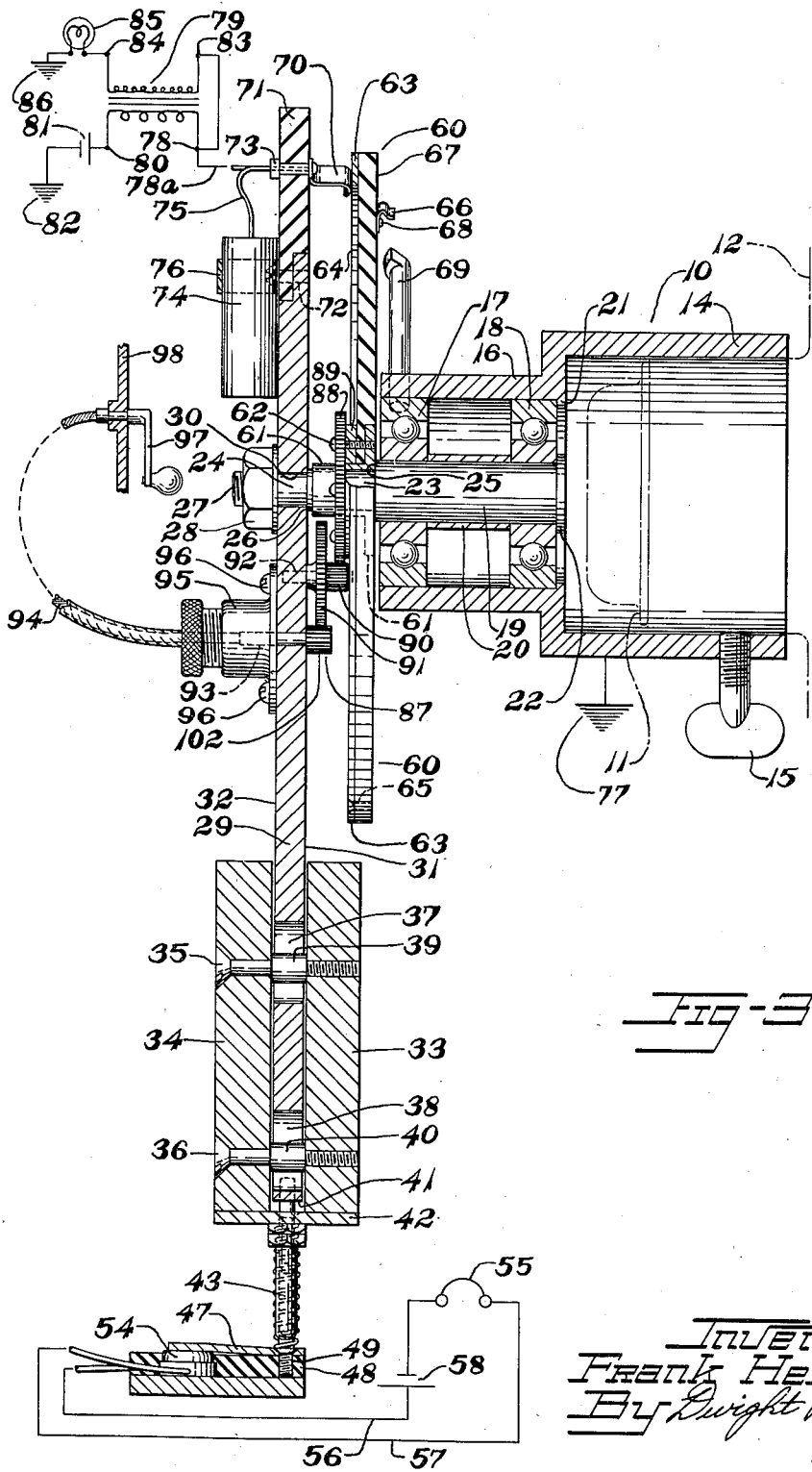

Nov. 25, 1952   F. HERZEGH   2,618,971
TIRE THUMP DETECTION DEVICE
Filed Jan. 27, 1950   2 SHEETS—SHEET 1
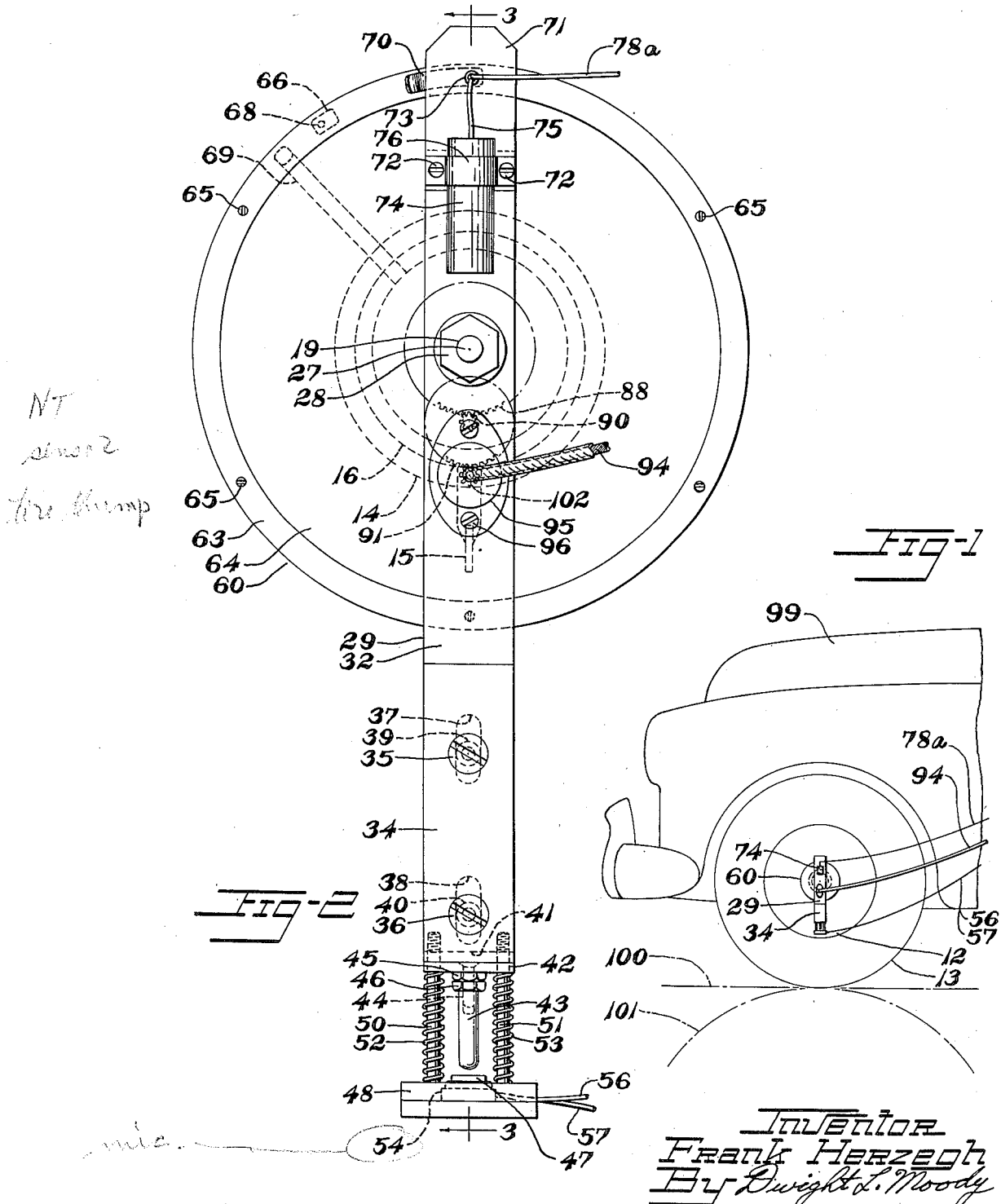
Inventor
Frank Herzegh
By Dwight L. Moody
Atty Nov. 25, 1952      F. HERZEGH      2,618,971

TIRE THUMP DETECTION DEVICE

Filed Jan. 27, 1950      2 SHEETS—SHEET 2

Inventor
Frank Herzegh
By Dwight L. Moody
Atty

Patented Nov. 25, 1952

2,618,971

UNITED STATES PATENT OFFICE 2,618,971

TIRE THUMP DETECTION DEVICE

Frank Herzegh, Shaker Heights, Ohio, assignor to The B. F. Goodrich Company, New York, N. Y., a corporation of New York Application January 27, 1950, Serial No. 140,787

7 Claims. (Cl. 73—146)

The invention relates to detecting the occurrence of thump in a rotating tire and also determining the rotative position of the tire at the time of the thump.

Some pneumatic tires on the wheels of vehicles in operation on smooth highways have been subject to objectionable thumps resembling those movements caused by the striking of bumps. A tire having such characteristics has sometimes been referred to as a "thumper."

Thump may be due to an unequal distribution of the materials of the tire resulting in a localized zone or portion of increased thickness and stiffness that produces the thump. Such a zone is not, however, generally apparent by visual inspection of the exterior of the tire and is not readily located.

To the end that the cause or causes of the thump can be established by dissection and analysis of that portion of the tire effecting the thump, the exact location of such portion must be determined. It is an object of the invention to provide conveniently for detecting the occurrence of tire-thump and for determining accurately the portion of the tire causing the thump.

Other objects are to provide for sensitivity and responsiveness of the apparatus for detecting the occurrence of tire-thump in a rotating tire; to provide for registering the rotative position of the tire at the occurrence of thump; to provide for synchronizing the detecting and the position-registering functions of the apparatus; to provide for electrically registering the occurrence of tire-thump; to provide for electrically registering the rotative position of the tire; to provide audible and visual registering of these; and to provide for simplicity of construction, convenience of manufacture and use, and for effectiveness of operation.

More specific objects are to provide for portability of the apparatus; to provide for detachably mounting the apparatus on the wheel of the mounted tire; to provide inertia means for detecting the occurrence of tire-thump; to provide cyclical flasher means for signaling each revolution of the tire; to provide for full circle i. e. 360° adjustment of the flasher means; and to provide for determining thump in the operation of the tire on the highway or in the laboratory.

These and other objects and advantages will be apparent from the following description.

In the accompanying drawings which form a part of this specification and in which like numerals are employed to designate like parts throughout the same, Fig. 1 is a front elevational view of tire-thump locating apparatus on the wheel of the mounted tire of an automobile, and constructed in accordance with and embodying the invention, Fig. 2 is a front elevational view of the apparatus shown in Fig. 1, and Fig. 3 is a sectional view of the apparatus taken along line 3—3 of Fig. 2, and also showing diagrammatically the electrical circuits of the apparatus.

The illustrative apparatus shown in the drawings has a metal support element or tubular housing 10 detachably mounted on the axle or hub 11 of a rotating wheel 12 and tire 13 for movement therewith in response to the occurrence of tire-thump. The housing 10 may be of open-ended, stepped construction providing an attaching portion 14 having an attaching set screw 15, and projecting portion 16 of reduced size and bore having axially spaced-apart, metal bearings 17, 18 such, for example, as ball bearings carrying a metal shaft 19 at the axis of the housing and axle for rotative movement of the shaft relative to the housing. A metal separator tube 20 on the shaft spaces the bearings, one of which 18 seats against a shoulder 21 of the housing, as shown especially in Fig. 3.

The shaft 19 has an annular flange 22 at one end seated against the bearing 18 and is desirably of stepped construction at the other end beyond the bearing 17 providing mounting portions 23, 24 and shoulders 25, 26, the mounting portion 24 terminating in an externally threaded end 27 for engaging an internally threaded hollow nut 28. The housing 10 and shaft 19 arrangement is desirably electrically conductive for grounding purposes.

The apparatus has provision for detecting the occurrence of tire-thump, and to this end includes a metal pendulum or elongated guide bar 29 having an aperture 30 through which the threaded mounting portion 24 of the shaft 19 extends so that the guide bar is held disposed between the nut 28 and the shoulder 26. The guide bar is dependent from the shaft in relatively rotatable relation thereto with the longitudinal axis of the guide bar perpendicularly intersecting the axis of rotation of the shaft.

Inertia elements or weights 33, 34, desirably of suitable metal material, are carried by the guide bar, one at each of its side faces 31, 32 in closely adjacent relation and at the lower end of such bar remote from the shaft, for movement of the weights along the longitudinal axis of and relative to the guide bar in response to substantially vertical movement of the housing 10 at the time of tire-thump and also for assisting to maintain the pendulum vertical during rotation of the wheel. The weights 33, 34 may be secured to the guide bar by spaced-apart screw fasteners 35, 36 extending through the weight 34 and the elongated openings 37, 38 in the guide bar and threadedly engaging the other weight 33, tubular guide spacers 39, 40 being provided on the screws for maintaining a slight clearance between the faces 31, 32 of the guide bar and the weights to facilitate the desired upward and downward movement of the guide bar relative to the inertia elements or weights.

The weights 33, 34 which may project beyond the lower end face 41 of the guide bar 29, are interconnected at their lower ends by a metal plate element 42 suitably secured thereto and spaced from the end face 41. A striker or hammer 43 of steel or other suitable hard material projects downwardly from the plate element 42 in alignment desirably with the axis of the guide bar 29, and is secured adjustably to the plate element 42 by a screw fastener 44 and adjusting nuts 45, 46, as shown especially in Fig. 2.

Immediately below and spaced-apart from the free end of the striker 43, is disposed a sound-producing member or anvil 47 of steel or other suitable hard material capable of vibrating and emitting an audible sound when struck by the striker. The anvil 47 is secured to a base 48 of hard rubber or other electrically insulating material by a screw fastener 49. The base 48 is fixedly supported on the guide bar 29 by laterally spaced-apart metal rods 50, 51 extending upwardly from the base through spaced-apart apertures in the plate element 42 and into threaded engagement with the guide bar 29. Springs 52, 53, preferably of the coiled compression type disposed about the rods 50, 51 between the base 48 and the plate element 42, normally support the weights 33, 34 so that they can move upwardly and downwardly relative to the guide bar 29 within the limits of the elongated openings 37, 38 and resiliently cushion the relative movement of the weights at the occurrence of tire-thump.

For electrically registering the thump, there is provided a microphone 54, desirably of the carbon resistance type, mounted on the hard rubber base 48 so that the microphone is in contact with but electrically insulated from the anvil 47, as shown especially in Fig. 3, whereby the sound emitted by the anvil is picked up by the microphone and electrically transmitted to a headphone 55 through conductor leads 56, 57 and a suitable source of electrical power such, for example, as a battery 58. If desired, any suitable electronic audio amplifier (not shown) may be included in the microphone-headphone electrical circuit for amplifying the electrical signal transmitted to the headphone 55.

When tire-thump occurs, the resulting abrupt, vertically upward movement of the rotating wheel and tire and housing 10 compels corresponding movement of the guide bar 29 and the anvil 47 of the base 48. This movement of the bar 29 is relative to the weights 33, 34 which tend to remain stationary due to their inertia. This movement of the bar is against the resilient resistance of the springs 52, 53, so that the striker 43 hits and rebounds from the anvil 47, thereby producing an audible click in the headphone and registering the occurrence of thump. The click is repeated once each revolution of the tire if there is one faulty portion of the tire causing thump.

The apparatus has provision for determining the rotative position of the tire at the occurrence of tire-thump which is indicated by the click in the headphone 55, and to this end includes a flat, circular disc 60 of stiff, electrically insulating material such, for example, as hard rubber mounted on the mounting portion 23 of the shaft 19 adjacent and axially spaced from the guide bar 29 for rotative movement relative to the housing 10 and to the guide bar. The disc 60 may be secured to a metal flanged bushing 61 by a plurality of circumferentially spaced-apart screw fasteners 62, 62 engaging the flange of the bushing 61 which is seated against the inner shoulder 25 of the shaft 19, as shown especially in Fig. 3.

A conductor ring 63 extends about the periphery of the disc 60 at its face 64 adjacent the guide bar and is secured to the disc by a plurality of circumferentially spaced-apart screw fasteners 65, 65. A contactor 66, desirably of phosphor bronze strip material and resilient construction, projects from the other face 67 of the disc toward the housing 10 and is secured to the disc 60 opposite the conductor ring 63 by one or more conductive screw fasteners 68 to provide an electrical connection of the contactor 66 with the ring 63.

A second contactor 69 of suitable electrically conductive metal rod material is fixedly secured to and projects radially outward from the projecting portion 16 of the housing 10 to a position for contacting the contactor 66 of the disc. The two contactors 66 and 69 constitute a make-and-break type electrical switch.

For maintaining an electrical connection with the conductor ring 63 despite rotative and full circle adjusting movement of the disc 60 with respect to the guide bar 29, a sliding contactor 70, desirably of phosphor bronze strip material, is constructed and arranged for resiliently pressing against the ring 63. The contactor 70 is disposed, as by a fitting 73 of electrically conductive metal material, on a mounting block 71 of hard rubber insulating material which may be secured to the upper shouldered portion of the guide bar as by conductive screw fasteners 72, 72, whereby the contactor 70 is electrically insulated from the guide bar 29.

An electrical condenser 74 is preferably positioned on the block 71 at its face opposite the sliding contactor 70 and in close proximity to the latter for facilitating a short conductor 75 connection of one plate of the condenser 74 to the contactor 70 and to the contactor 66 for effectively suppressing sparking and preventing objectionable arcing between the make-and-break contactors 66 and 69. The condenser 74 which may have a metal outer shell and attaching strap 76, is attached to the block 71 and the guide bar 29 by the conductive screw fasteners 72, 72 which engage the attaching strap 76 and the guide bar, as shown especially in Fig. 3, thereby electrically grounding the condenser to the wheel and vehicle as indicated by the numeral 77, through the medium of the guide bar 29, the shaft 19, the bearings 17, 18 and the housing 10. The contactor 69 is also grounded at 77 through the housing 10 to complete in part the make-and-break electrical circuit described hereinabove.

The sliding contactor 70 and the condenser 74 are connected to one terminal 78 of the primary side of an iron core type of electrical transformer 79 by a suitable electrical conductor 78a. The other terminal 80 of the primary side of the transformer is connected in series to a suitable source of electrical power such, for example, as a battery 81 and to an electrical ground indicated by the numeral 82. One terminal 83 of the stepup secondary side of the transformer 79 is connected to the terminal 78. The other terminal 84 of the secondary side is connected in series to an indicator such, for example, as a neon flash lamp 85 and to an electrical ground indicated by the numeral 86. The transformer 79, battery 81 and flash lamp 85 may, if desired, be arranged in a suitable box (not shown) for portability and convenience of use in which case the fitting 73 connected to the contactor 70 and condenser 74 may be of the separable type.

For the arrangement described hereinabove, the flash lamp 85 glows once each revolution of the wheel 12 and tire 13 at the time of momentary break between the rotating contactor 69 of the housing 10 with the contactor 66 of the disc 60. To determine the rotative position of the tire at the occurrence of thump, the glow of the flash lamp 85 may be synchronized with the click of the headphone 55 so that both the glow and the click occur simultaneously.

To this end there is provided a synchronizing mechanism, preferably a gear reduction train 87, connecting the guide bar 29 and the rotatively mounted disc 60, as shown especially in Fig. 3, for adjusting the angular position of the disc and its contactor 66, especially throughout a range of 360°, with respect to the guide bar 29 and the rotating contactor 69. The gear train 87 which may have a large overall gear reduction ratio for sensitivity of adjustment, includes a suitably toothed gear 88 mounted on the flanged bushing 61 with a metal washer 89 between the gear and the disc 60, the gear 88 being secured to the disc by the screw fasteners 62, 62.

The gear 88 meshes with a toothed pinion 90 of an integrally united gear 91 and pinion 90 member mounted rotatively on a headed stud 92 secured to the guide bar 29 at its face 31 and at a position spaced from the shaft 19. The gear 91 meshes with a toothed pinion 102 secured fixedly to a rotatable stub shaft 93 carried by the guide bar 29 at a position spaced from the stud 92 and connected to a flexible driving cable 94 at the attaching fitting 95 which is secured as by screw fasteners 96, 96 to the guide bar at its face 32. The flexible cable 94 may be turned manually as by a metal hand crank 97 secured to its other end, which crank 97 may, if desired, be detachably mounted on the dashboard 98 of the automobile or other vehicle 99 carrying the wheel 12 and mounted tire 13 to be tested, for example, on the smooth highway 100, as indicated by a broken straight line in Fig. 1, or on a smoothly surfaced, rotatively mounted cylinder 101, as indicated by a broken curved line in Fig. 1.

The synchronizing mechanism is operated as by manually turning the hand crank 97 in either the clockwise or counter-clockwise direction which results in relative rotation of the respective gears and pinions of the gear train 87 such that the disc 60 is rotated relative to the guide bar 29 and shaft 19 and housing 10 so as to alter the angular relationship of the contactor 66 with respect to the guide bar 29. In this manner the contactor 66 may be shifted 360° relative to the guide bar and the tire and is moved to a particular rotative position whereby the flashing of the lamp 85 simultaneously occurs with each click of the headphone 55.

In testing a tire for determining precisely its portion causing a thump, the apparatus is mounted on the hub or axle 11 of the wheel 12 of the mounted tire, as shown especially in Fig. 1, the housing 10 being separably attached to the hub by means of the set screw 15. The guide bar 29 and its spring-suspended weights 33, 34 constitute a ball-bearing mounted pendulum with the longitudinal axis of the pendulum remaining vertical while the wheel and tire are rotating on the highway or the cylinder. Abrupt vertical movement of the hub 11 caused by a thumping tire is translated electrically into an audible click in the headphone 55, when the striker 43 hits the anvil 47 contacting the microphone 54. The click occurs once each revolution of the tire, if there is one faulty, thump-producing portion of the tire.

The contactor 69 of the tire-position registering means of the apparatus is in fixed position relationship to the mounted tire and rotates directly with the tire. Once each revolution of the tire, the contactor 69 makes and breaks electrical contact with the contactor 66 of the disc 60, whereby the neon lamp 85 is flashed cyclically. The hand crank 97 is turned to shift the rotative position of the contactor 66 relative to the guide bar 29 and the tire 13 so that the click and the flash are in synchronism.

Since the extension of the axis of the pendulum or guide bar passes through the extension of the line of contact between the rotating tire and the highway or cylinder, when the thump originates, the axis of the pendulum, after the synchronization of the click and the flash, points to the faulty, thump-producing portion of the tire, when either the guide bar or the tire is turned until the make-and-break contactors 66 and 69 again flash the lamp. Thus, the position of the faulty portion of the tire is exactly and conveniently determined, whereby subsequent dissection and analysis of the faulty portion causing the thump may be made.

Variations may be made without departing from the scope of the invention as defined in the following claims.

I claim:

1. Tire thump locating apparatus comprising a tubular support having a shaft extending axially and rotatably mounted therein with a portion of the shaft projecting from an end of the support and said support having at its other end means for attaching said support in a substantially horizontal disposition to a substantially vertically positioned wheel of a mounted rotating tire to hold the shaft with its longitudinal axis at and extending in the direction of the axis of rotation of the wheel so that, with the tire under load and in contact at its tread with a supporting surface, movement of the support and shaft with the wheel occurs in response to the occurrence of thump in the tire, a guide bar mounted dependently on said shaft at said portion thereof in substantially perpendicular relation to said axis of the shaft, a weight mounted on said guide bar at an end thereof for movement of said weight relative to said bar in response to said movement of said shaft, electro-mechanical means including an anvil carried by said guide bar and including a striker carried by said weight for striking said anvil and indicating the occurrence of tire thump, a disc of electrically non-conductive material mounted on said shaft spaced from said guide bar in rotatable relation to said bar and to said shaft and said support, said disc being normally disposed in stationary relation to said bar and at the same time rotatively adjustable relative to said bar, a conductor ring on said disc about the periphery thereof having an electrical contactor, a second electrical contactor on said support for contacting the first said contactor once each revolution of the wheel, a sliding contactor on said guide bar in electrical contact with said ring, electrical indicating means including a flash lamp electrically connected with said sliding contactor and said second contactor, and adjusting means including a gear mechanism connecting said guide bar and said disc for rotating said disc relative to said bar to synchronize the operation of said electro-mechanical means and said electrical indicating means at the occurrence of tire-thump.

2. Tire-thump locating apparatus comprising a support for mounting on and rotation with a substantially vertically positioned wheel of a mounted rotating tire under load with the tread of the tire contacting a supporting surface, a pendulum rotatably mounted on said support and adapted to remain substantially stationary and vertical upon rotation of the wheel and tire, inertia means on said pendulum for indicating the occurrence of thump in the tire upon said rotation thereof, and means comprising an element mounted on said support for rotation therewith and a second element rotatively connected with said pendulum and rotatably mounted on said support for relative rotative movement with respect to said support and said pendulum and for contacting the first said element and said second element being normally disposed in stationary relation to said pendulum and at the same time rotatively adjustable relative to the first said element and to said pendulum for indicating the rotative position of the tire at the occurrence of thump by virtue of the contact of said elements.

3. Tire-thump locating apparatus comprising a support for mounting on and rotation with a substantially vertically positioned wheel of a mounted rotating tire under load with the tread of the tire contacting a supporting surface, a pendulum rotatably mounted on said support and adapted to remain substantially stationary and vertical upon rotation of the wheel and tire, inertia means on said pendulum for indicating the occurrence of thump in the tire upon said rotation thereof, and means comprising an element mounted on said support for rotation therewith and a disc rotatably mounted on said support for relative rotative movement with respect to said support and said pendulum, said disc being normally disposed in stationary relation to said pendulum and at the same time being in rotatively adjustable relation to said support and said pendulum and said disc having a second element mounted thereon for contacting the first said element for indicating the rotative position of the tire at the occurrence of thump by virtue of the contact of said elements.

4. Tire-thump locating apparatus comprising a support for mounting on and rotation with a substantially vertically disposed wheel of a mounted rotating tire with said support projecting away from the wheel at its axis of rotation and with the tire under load and the tread of the tire contacting a supporting surface so that movement of said support with the wheel occurs in response to the occurrence of thump in the tire, inertia means having an element mounted rotatably and dependently on said support for movement therewith and for disposition substantially perpendicular to said axis of rotation of the wheel and an inertia element mounted on and movable relative to the first said element and biasing means mounted on the first said element and connected to said inertia element for normally holding said inertia element in spaced-apart relation to the first said element by the biasing force of said biasing means which force is adapted to be overcome by the inertia of said inertia element to permit relative movement of said elements one to the other in response to said movement of said support for indicating the occurrence of tire-thump, and means including a contactor element mounted on said support for rotation therewith and a second contactor element rotatably mounted on said support for relative rotative movement with respect to said support and said inertia means and for contacting the first said contactor element so as to indicate the rotative position of the tire at the time of said relative movement of said elements of said inertia means by virtue of the contact of said contactor elements, said second contactor being normally disposed in stationary relation to the first said element of said inertia means and at the same time rotatively adjustable relative to said first said element.

5. Tire-thump locating apparatus comprising a support for mounting on and rotation with a substantially vertically disposed wheel of a mounted rotating tire with said support projecting away from the wheel at its axis of rotation and with the tire under load and the tread of the tire contacting a supporting surface so that movement of said support with the wheels occurs in response to the occurrence of thump in the tire, electrical indicating means comprising inertia means having an element mounted rotatably and dependently on said support for movement therewith and for disposition substantially perpendicular to said axis of rotation of the wheel and an inertia element mounted on and movable relative to the first said element and biasing spring means mounted on the first said element and connected to said inertia element for normally and resiliently holding said inertia element in spaced-apart relation to the first said element by the biasing force of said biasing spring means which force is adapted to be overcome by the inertia of said inertia element to permit relative movement of said elements one to the other in response to said movement of said support and electrical means operative in response to said relative movement of said elements of the inertia means for indicating electrically the occurrence of tire-thump, electrical indicating means comprising a contactor element mounted on said support for rotation therewith and a second contactor element rotatably mounted on said support for relative rotative movement with respect to said support and said inertia means and for contacting the first said contactor element so as to indicate the rotative position of the tire at the time of the relative movement of said elements of said inertia means, said second contactor element being normally disposed in stationary relation to the first said element of said inertia means and at the same time rotatively adjustable relative to said first said element, and synchronizing means for adjusting the rotative position of said second contactor element in relation to said inertia means to synchronize the operation of the first said and the second said electrical indicating means at the occurrence of tire-thump.

6. Tire-thump locating apparatus as defined in claim 5 in which said electrical means of the first said electrical indicating means includes electrically operated sound producing means for audibly indicating the occurrence of tire-thump, and in which the second said electrical indicating means includes a flash lamp electrically connected with said support and said second contactor element for visually indicating each revolution of the rotating tire.

7. Tire-thump locating apparatus comprising a support for mounting on and rotation with a substantially vertically positioned wheel of a mounted rotating tire under load with the tread of the tire contacting a supporting surface, a pendulum rotatably mounted on said support and adapted to remain substantially stationary and vertical upon rotation of the wheel and tire, inertia means on said pendulum for indicating the occurrence of thump in the tire upon said rotation thereof, means comprising an element mounted on said support for rotation therewith and a second element rotatively connected with said pendulum and rotatively mounted on said support for relative rotative movement with respect to said support and said pendulum, said second element being normally disposed in stationary relation to said pendulum and at the same time being in rotatively adjustable relation to said support and said pendulum for indicating the rotative position of the tire at the occurrence of thump by virtue of the contact by said elements, and gear means connected with said pendulum and said second element of the last said means for adjusting the rotative position of said second element.

FRANK HERZEGH.

REFERENCES CITED

The following references are of record in the file of this patent:

UNITED STATES PATENTS

| Number | Name | Date |
|---|---|---|
| 1,599,922 | Rathbone | Sept. 14, 1926 |
| 2,004,270 | Davey | June 11, 1935 |
| 2,174,176 | Journeaux et al. | Sept. 26, 1939 |
| 2,344,349 | Forster | Mar. 14, 1944 |